United States Patent
Koppel

[19]

[11] Patent Number: 6,116,543

[45] Date of Patent: *Sep. 12, 2000

[54] METHOD AND A SYSTEM FOR PUTTING A SPACE VEHICLE INTO ORBIT, USING THRUSTERS OF HIGH SPECIFIC IMPULSE

[75] Inventor: Christophe Koppel, Nandy, France

[73] Assignee: Societe Nationale d'Etude et de Construction de Moteurs d'Aviation, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/833,094

[22] Filed: Apr. 4, 1997

[51] Int. Cl.⁷ ................................................. B64G 1/26
[52] U.S. Cl. ..................... 244/158 R; 244/164; 244/172
[58] Field of Search ............................... 244/158 R, 164, 244/172

[56] References Cited

U.S. PATENT DOCUMENTS

| | | | |
|---|---|---|---|
| 4,943,014 | 7/1990 | Harwood et al. | 244/158 R |
| 5,163,641 | 11/1992 | Yasaka. | |
| 5,507,454 | 4/1996 | Dulck. | |
| 5,595,360 | 1/1997 | Spitzer | 244/158 R |
| 5,681,011 | 10/1997 | Frazier. | |

FOREIGN PATENT DOCUMENTS

| | | |
|---|---|---|
| 0673833 | 9/1995 | European Pat. Off.. |
| 0047211 | 3/1982 | France. |

OTHER PUBLICATIONS

"Transferts Economiques Plans de Type Hohmann Entre Orbites Quasi–Circulaires Coaxiales Proches", J.P. Marec, Astronautica Acta, vol. 13, No. 3, 1967, Great Britain, pp. 269–279.

"Explicit Guidance of Drag–Modulated Aeroassisted Transfer Between Elliptical Orbits", Nguyen X. Vinh, et al, Journal of Guidance, Control and Dynamics, vol. 9, No. 3, Jun. 1986, Austin, Texas, U.S.A., pp. 274–280.

"Benefits of Electric Propulsion for Orbit Injection of Communication Spacecraft", F. Porte, et al, 14th AIAA International Communication Satellite Systems Conference, Mar. 22, 1992, pp. 1–9.

*Primary Examiner*—Peter M. Poon
*Assistant Examiner*—Tien Dinh
*Attorney, Agent, or Firm*—Weingarten, Schurgin, Gagnebin & Hayes LLP

[57] ABSTRACT

The method serves to place a space vehicle, such as a satellite, on a target orbit such as the orbit adapted to normal operation of the space vehicle and starting from an elliptical initial orbit that is significantly different from, and in particular more eccentric than the target orbit. The space vehicle is caused to describe a spiral trajectory made up of a plurality of intermediate orbits while a set of high specific impulse thrusters mounted on the space vehicle are fired continuously and without interruption, thereby causing the spiral trajectory to vary so that on each successive revolution, at least during a first stage of the maneuver, perigee altitude increases, apogee altitude varies in a desired direction, and any difference in inclination between the intermediate orbit and the target orbit is decreased, after which, at least during a second stage of the maneuver, changes in perigee altitude and in apogee altitude are controlled individually in predetermined constant directions, while any difference in inclination between the intermediate orbit and the target orbit continues to be reduced until the apogee altitude, the perigee altitude, and the orbital inclination of an intermediate orbit of the space vehicle have substantially the values of the target orbit.

3 Claims, 11 Drawing Sheets

PRIOR ART

PRIOR ART

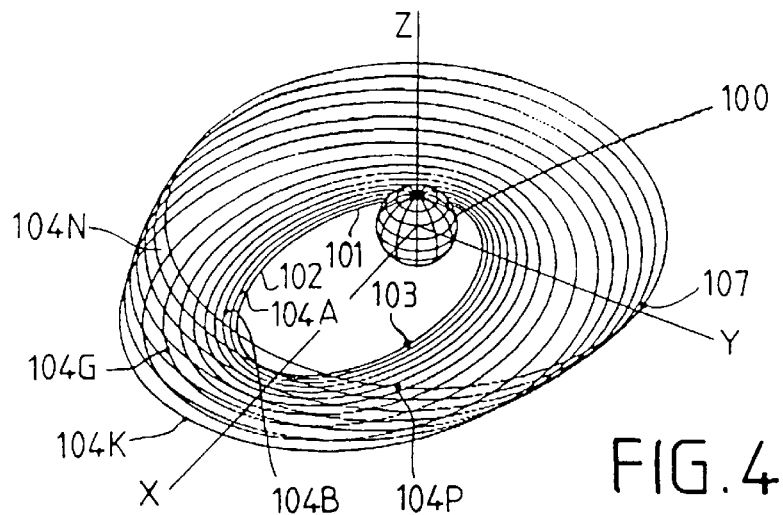
FIG. 4
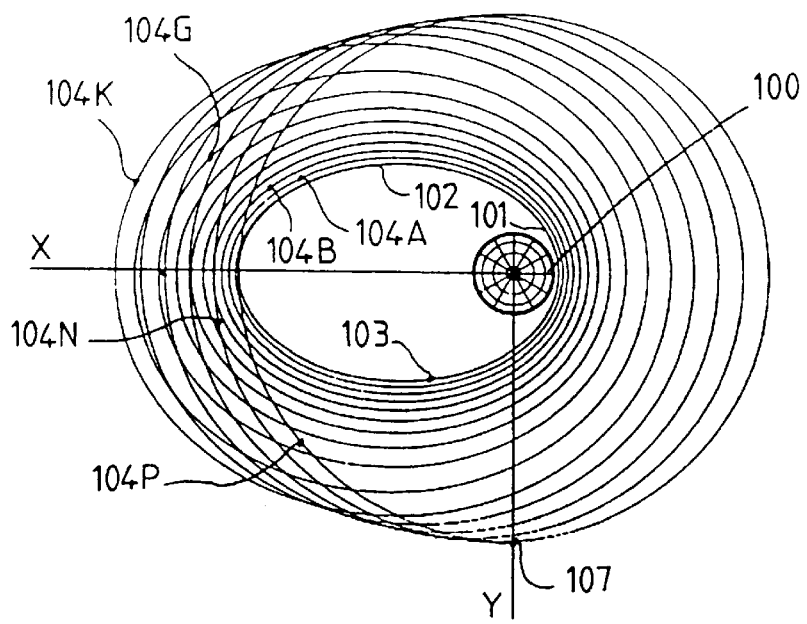
FIG. 5
FIG. 6
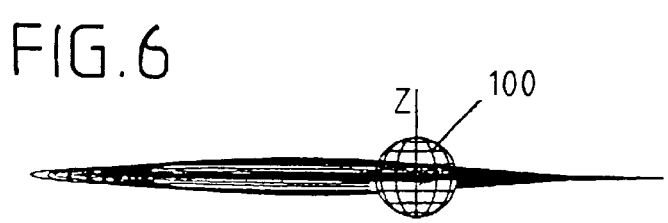

METHOD AND A SYSTEM FOR PUTTING A SPACE VEHICLE INTO ORBIT, USING THRUSTERS OF HIGH SPECIFIC IMPULSE

FIELD OF THE INVENTION

The present invention relates to a method of putting a space vehicle, such as a satellite, into a target orbit such as the orbit for normal operation of the space vehicle, starting from an elliptical initial orbit that is significantly different and in particular more eccentric than the target orbit.

PRIOR ART

Most artificial satellites are now fitted with a thruster system enabling them to move in space, in particular to correct imperfections of trajectory, due in particular to imperfections with which they were put into orbit, to the gravitational attraction of the moon and the sun, to potential effects due to the earth being non-spherical, to aerodynamic, magnetic, and electrical effects associated with the earth, and to the action of solar radiation. The thrust system of a satellite also enables the satellite to be put on station, to make changes to its orbit, to ensure that it is appropriately oriented in space, or indeed to ensure that the attitude control system remains functional by enabling the inertia wheels fitted to such satellites to be desaturated.

Such thrust systems generally give a satellite the ability to move in any direction, with one direction being generally preferred for performing movements of large amplitude.

In terms of mass budget, the satellite's thruster system generally constitutes a major component, or even the largest component.

Most of the thruster industry became interested very early on in techniques for reducing the mass of a thruster system. Given that specific impulse is a characteristic value of a thruster, specifying the impulse provided per unit mass ejected or consumed, high specific impulse thrusters have been designed, developed, and evaluated. By way of example, mention can be made of "resistojet" type thrusters, closed electron drift plasma thrusters, FEEP field emission thrusters, ion bombardment thrusters, and heliothermal thrusters.

Theocratically speaking, increasing specific impulse is based on transforming zero-mass power, i.e. power whose production consumes practically no matter, into mechanical power applied to particles of matter. In practice, such zero-mass power is electrical power or thermal power obtained from solar radiation, or indeed as obtained from a radioisotopic generator.

The thrust obtained from high specific impulse thrusters of this kind therefore depends on the level of electrical or thermal power that can be supplied to them. On a satellite, such power is limited by the size of its solar panels, by the size of its solar thermal energy concentrators, or by the size of its radioisotopic generator, or indeed by the size of its energy storage means. As a result, the thrust delivered by any high specific impulse thruster is small or very small compared with the thrust from a conventional chemical engine, e.g. 400 N (a typical value for a satellite apogee engine).

The greater the electrical or thermal power transformed into mechanical power applied to a given mass of particles, the greater the resulting specific impulse. Thus, the greater the specific impulse of thrusters, the lower the thrust provided for given consumption of electrical or thermal power. This property is substantially valid for all types of high specific impulse thruster.

This property has the following effects on propulsion systems: for a given total delivered impulse (i.e. the cumulative value or the time integral of the force delivered to the vehicle over the entire duration of firing), there is both a remarkable reduction in the mass of matter consumed by higher specific impulse thrusters and a corresponding increase in the time over which such thrusters operate.

Thrust of the high specific impulse type is suitable for the maneuvers performed when a satellite is on its nominal operating orbit, since the forces that need to be delivered are then low or very low, thus making it possible to achieve real advantages over chemical thrust systems (of lower specific impulse).

The opposite applies when a satellite is initially placed on an orbit that is very different from its nominal orbit and the satellite needs to operate its own thrust system to move from its initial orbit to its nominal orbit.

Under such circumstances, the total duration of the transfer maneuver tends to be lengthy whereas, on the contrary, it would be better to be able to minimize said duration. The longer the total duration of the transfer maneuver, the greater the financial burden, and costs associated with putting the vehicle into orbit also increase (including ground station costs and the cost of tracking teams on the ground). Also, a long duration transfer maneuver increases the risk of the space vehicle being damaged as it passes through the Van Allen belts (which vary in position, but which may be situated, for example, in the vicinity of the following altitudes: 1800 km, 2000 km, 10,000 km, and 21,000 km).

It is desirable to minimize the number of revolutions the vehicle performs on orbits that pass through the Van Allen belts, in particular to minimize the additional hardening of components or solar cells that would otherwise be needed to protect them against the electromagnetic waves or radiation emitted by the protons or electrons present in the belts.

Various examples of satellite maneuvers have already been proposed that make use of thrusters having high specific impulse and low thrust.

Thus, the article by A. G. Schwer, U. W. Schöttle, E. Messerschmid of the University of Stuttgart (Germany), published at the 46th International Astronautic Congress in 1995 and entitled "Operational impacts and environmental effects on low-thrust transfer missions of telecommunication satellites", shows that a transfer maneuver between a conventional initial orbit constituted by the geostationary transfer orbit (GTO) of the Ariane 4 rocket and a final orbit constituted by a geostationary orbit (GEO). The transfer maneuver comprises a large number of thrust arcs about the apogee of the GTO orbit created by "Arcjet" type thrusters having high specific impulse, such that the orbit of the satellite deforms progressively until it reaches the final geostationary orbit GEO.

Document EP-B-0 047 211 (inventor A. Mortelette) also describes a method of changing orbit by thrust arcs.

For the two methods described in the two above-mentioned documents, apogee altitude is constrained to remain constant or to vary very slowly. The duration required by the maneuvers described is quite large, such that to reduce said duration it is necessary to increase thrust. Also, the number of times the engine needs to be started is also large and this can give rise to major operational constraints. When the satellite is on an orbit with a variable sidereal period which is changing constantly as a function of the extent to which its position is progressing, and which can be different or even very different from the sidereal period of earth rotation, the satellite is not always visible from a given ground station when it is necessary to start its thrusters. This means that any procedure for putting the satellite into orbit that requires thrusters to be started on numerous occasions cannot be performed safely using only one ground station. On the contrary, it must be possible to make use of a plurality of ground stations located at different places throughout the time required for putting the satellite into orbit. The cost of ground operations and rental of ground stations is not negligible.

In order to reduce the total duration of the maneuver in the schemes put forward in the above-mentioned document for putting a satellite into orbit, it would be better to have high thrust thrusters. However, under such circumstances, for given power delivered to the thrusters, the specific impulse would have to be smaller and consequently the mass consumed during the maneuver would be greater. The various solutions that have already been recommended for putting a satellite into orbit in this manner are therefore of relatively low performance.

Proposals have already been made by Irving, to pass from an initial circular orbit to a final circular orbit by continuously operating thrusters that are in alignment either with the local horizontal, or else with the orbital speed (speed relative to earth) so that the orbit deforms progressively and comes to the immediate vicinity of the final target orbit, or even reaches it. That type of maneuver leads to a spiral type trajectory and the maneuver can be performed by starting the thruster once only. Nevertheless, the number of revolutions in the Van Allen belts cannot be optimized, which is a drawback, and above all, at present that type of maneuver applies only to transfers between orbits that are circular or, where appropriate, between particular elliptical orbits.

Proposals have also been made to combine a set of maneuvers by means of thrust arcs with a subsequent maneuver of the spiral type, in the context of a particular maneuver described in document EP-A-0 673 833 (invention of A. Spitzer). If use is made only of high specific impulse and low thrust propulsion, that technique for putting a satellite into orbit is of relatively low performance, particularly in terms of duration. The number of revolutions that pass through the Van Allen belts is high and the number of times the thrusters are started is large, and unfortunately this large number of thruster starts is necessary during the first stage during which perigee altitude is increased, and in which the sidereal period is, in particular, different from the sidereal period of rotation of the earth.

A. Spitzer has also proposed a solution using "hybrid" propulsion, i.e. combining conventional chemical engines operated in a first maneuvering stage over a plurality of thrust arcs, and high specific impulse thrusters implemented in a second maneuver stage that is spiral shaped. Under such circumstances, the total duration of the transfer maneuver is greatly reduced and the number of revolutions in the Van Allen belts is smaller. However, the mass consumed during the maneuver is relatively large, and above all two different types of propulsion system need to be present, thereby increasing cost compared with systems having only one type of propulsion system, making the architecture of the satellite more complex, and increasing preparation and launch costs, in particular because of the need to fill various tanks with different substances and because of the precautions that need to be taken against the risks of pollution or of fire.

OBJECT AND BRIEF DESCRIPTION OF THE INVENTION

The present invention seeks to remedy the above-mentioned drawbacks and, in particular, to enable a satellite placed by a launcher or a space vehicle on an orbit that is not the nominal operational orbit of the satellite, and to reach said orbit in a manner that is particularly effective while using thrusters of high specific impulse and low thrust.

The invention seeks in particular to make it possible to minimize the duration of the transfer maneuver from the initial orbit to a target orbit.

The invention also seeks to improve the reliability of the maneuvers.

Another object of the invention consists in reducing the cost of manufacturing the space vehicle and of using it, and of reducing the risks associated with the use of chemical substances.

These objects are achieved by a method of placing a space vehicle, such as a satellite, on a target orbit such as that adapted to normal operation of the space vehicle and starting from an elliptical initial orbit that is substantially different from the target orbit and in particular more eccentric than the target orbit, wherein the space vehicle is caused to describe a spiral trajectory made up of a plurality of intermediate orbits during single continuous firing of a set of high specific impulse thrusters mounted on the space vehicle, progress of the spiral trajectory being controlled in such a manner that on each successive revolution, at least during a first stage of the maneuver, perigee altitude increases, apogee altitude moves in a determined direction, and any difference in inclination between an intermediate orbit and the target orbit decreases, then, at least during a second stage of the maneuver, changes in perigee and apogee altitude are controlled individually in constant predetermined directions while any difference in inclination of an intermediate orbit relative to the target orbit continues to be reduced until the apogee altitude, the perigee altitude, and the orbital inclinations of an intermediate orbit of the space vehicle have reached substantially the values of the target orbit.

Where appropriate, the assembly of high specific impulse thrusters may comprise a single high specific impulse thruster.

In this way, only one type of thruster is required for putting the satellite into its target orbit.

However, it is not impossible to include auxiliary thrusters of other types, such as cold gas thrusters or resistojets, and making use of the same gas as the high specific impulse thrusters, e.g. xenon, thereby making it possible during short instants to obtain greater thrust levels, while avoiding the above-mentioned drawbacks of chemical thrust.

Such auxiliary thrusters may be used in an initial stage, e.g. for controlling parasitic moments due to deploying the solar panels.

In a first particular implementation, for a space vehicle initially on an elliptical orbit that is substantially different from the target final orbit for normal operation of the vehicle, during the first stage of the maneuver starting from the beginning of continuous firing of the thrusters, and on each successive revolution, apogee altitude of intermediate orbits is caused to increase and perigee altitude to increase to a lesser extent, and during the second stage of the maneuver, until the end of continuous firing, on each successive revolution, apogee altitude of intermediate orbits is decreased while perigee altitude is increased.

In a second particular implementation, during the first stage of the maneuver, from the beginning of continuous firing of the thrusters, and on each successive revolution, apogee altitude of the intermediate orbits is increased and so is perigee altitude, during a second stage of the maneuver, near the middle of continuous firing, and on each successive revolution, apogee altitude of intermediate orbits is decreased and perigee altitude is increased, and then during a third stage of the maneuver, once the eccentricity of intermediate orbits of the space vehicle has substantially reached that of the target orbit, and until the end of continuous firing, during each successive revolution, apogee altitude is decreased and perigee altitude is decreased while any difference of inclination of intermediate orbits relative to the target orbit continues to be decreased, until apogee altitude, perigee altitude, and orbital inclination of an intermediate orbit of the space vehicle have reached substantially the values of the target orbit.

In a third particular implementation, during the first stage of the maneuver starting from the beginning of continuous firing of the thrusters, and on each successive revolution, apogee altitude of the intermediate orbits is decreased and perigee altitude is increased, and then during the second stage of the maneuver, until the end of continuous firing, once the eccentricity of the intermediate orbits of the space vehicle has reached substantially that of the target orbit, and on each successive revolution, apogee altitude of the intermediate orbits is decreased and perigee altitude is also decreased.

The invention also provides a system for placing a space vehicle, such as a satellite, on a target orbit such as that adapted to normal operation of the space vehicle and starting from an elliptical initial orbit that differs substantially from the target orbit, and in particular that has eccentricity that is different from that of the target orbit, the system comprising:

a set of platforms mounted on the space vehicle;

a set of thrusters mounted on said platforms and having high specific impulse, greater than 5000 Ns/kg, and low thrust, less than 10 N, to create a total thrust force applied to the space vehicle;

a control device for putting the thrusters into continuous operation after the space vehicle has been placed on its initial orbit so as to enable said space vehicle to reach a target orbit via a completely spiral trajectory, ignoring possible service interruptions, and to stop the thrusters firing when the apogee altitude, the perigee altitude, and the orbital inclination of an intermediate orbit of the space vehicle are substantially equal to the values of the target orbit; and a thrust direction control device comprising at least first means for operating, during a first stage of continuous firing of the set of thrusters, to generate first control signals for aiming total thrust such that on each successive revolution of the space vehicle and in each intermediate orbit, apogee altitude increases, perigee altitude increases to a lesser extent, and any difference in the inclination of the intermediate orbit relative to the target orbit is decreased, and at least second means for operating, during a second stage of the set of thrusters firing, to generate second control signals for aiming total thrust such that on each successive revolution of the space vehicle and in each intermediate orbit, apogee altitude decreases, perigee altitude increases, and any difference of inclination between the intermediate orbits and the target orbit decreases.

Advantageously, the set of thrusters having high specific impulse comprises plasma type closed electron drift thrusters, ion thrusters, or "Arcjet" type thrusters (i.e. electric arc thrusters).

In a particular embodiment, said first and second means for generating the first and second control signals for aiming total thrust include a set of sensors enabling the attitude of the space vehicle to be verified or checked, and are actuated while the device for controlling operation of the thrusters in continuous manner continues to act so that firing is continuous.

More particularly, said first means of said device for controlling thrust aiming include means for aligning total thrust in a local horizontal plane, mainly directed in the direction of the speed of the space vehicle.

In which case, more particularly, said second means of said device for controlling thrust aiming comprise means for operating around apogee to bring the total thrust into alignment in a local horizontal plane mainly with the speed direction of the space vehicle, and means for operating around perigee to bring the total thrust into alignment with a direction opposite to the orbital speed of the space vehicle in a plane that is substantially orthogonal to the orbital plane.

The means for operating around apogee to align total thrust serve to aim total thrust substantially along the osculating half-ellipse centered on apogee.

The means for operating around perigee to align total thrust serve to aim total thrust substantially on the osculating half-ellipse centered on perigee.

In a variant embodiment, said first and second means of said device for controlling thrust aiming include means for aligning thrust in a plane passing via directions that are fixed or almost fixed in space and passing almost perpendicularly to the plane that is tangential to the orbit.

The system may include means for aiming total thrust that are constituted by means belonging to the space vehicle such as inertia wheels of a system for controlling the attitude of the space vehicle.

The system may also include means for aiming total thrust constituted by at least some of said platforms for supporting sets of thrusters, said platforms being steerable. Adjustable-thrust thrusters can also be used.

The system of the invention may include means for steering total thrust including means for differentially aiming said steerable platforms and means for servo-controlling the thrust from each thruster to a predetermined value, thereby enabling total thrust to be generated that passes through the center of mass of the space vehicle and that has a component lying outside the orbital plane.

Advantageously, the steerable platforms can be steered through more than 10° at least about one axis.

In an advantageous embodiment of the invention, said thrusters having high specific impulse also constitute means for controlling attitude and orbit of the space vehicle such as a satellite.

It may be observed that with the method of the invention, by ensuring both a continuous increase of perigee (possibly terminating by a decrease of altitude), and a variation in apogee altitude beginning with an increase and ending with a decrease, it is possible from almost any elliptical initial orbit to reach a very diverse multitude of final orbits, while keeping the thrusters continuously in operation.

In particular, when the initial orbit and the final target orbit have apogees that are close together, it is possible according to the invention to ensure that any increase in apogee altitude during thruster firing is substantially equal to any decrease. In which case, the entire maneuver ends up with an increase in perigee altitude.

Although the type of maneuver defined in the method and system of the invention can be applied to elliptical initial orbits that are arbitrary relative to the target orbit, the present invention is particularly advantageous when the initial orbit is elliptical, fairly eccentric (having eccentricity greater than 0.2), of sidereal period that is shorter than that of the target orbit (which implies in particular that the perigee altitude of the initial orbit is lower than that of the target final orbit), that has its apogee close to that of the target orbit, and in which the target final orbit is circular or has no eccentricity (eccentricity less than 0.1). Such circumstances apply when launching a geostationary satellite into a geostationary transfer orbit, or when launching into its transfer orbit a satellite that is to occupy a circular orbit at medium altitude (e.g. 20,000 km). Successive increases of apogee during firing lead to best efficiency for the maneuver which consists mainly in increasing perigee altitude. Towards the end of thruster firing, successive decreases in apogee altitude lead to additional consumption by the thrusters, but such additional consumption remains modest and enables a significant reduction to be achieved overall concerning the total duration of the maneuver.

The method of the invention can be applied advantageously when the initial orbit is elliptical and has a sidereal period that is smaller than that of the target final orbit, even when the apogee altitude of the initial orbit is very different from that of the target orbit and the target final orbit is circular.

The third implementation of the invention is particularly adapted to minimizing the number of revolutions in the Van Allen belts. In this method, the high specific impulse thrusters are fired continuously and their total thrust is steered, e.g. to increase perigee altitude and to decrease apogee altitude of the intermediate orbits, and then without interrupting thruster operation, their total thrust is steered so as to continuously decrease apogee altitude and simultaneously decrease perigee altitude such that, in the end, perigee and apogee altitudes coincide with those of the target final orbit.

Such a particular implementation is well suited to launching a space vehicle onto a transfer orbit that is very highly eccentric and of a sidereal period greater than or equal to that of the target orbit. An extreme characteristic example is launching a satellite that is to occupy a geostationary orbit having a period of 1 day, starting from an orbit with a 620 kg perigee and a 330,000 km apogee, i.e. an orbit having an 8-day period. With an initial mass of 2950 kg and a total thrust of 0.64 N, it is possible to operate the high specific impulse thrusters of the invention so as to have only two revolutions in the Van Allen belts. By using such a small number of intermediate orbits passing through the Van Allen belts, the performance of the method of the invention turns out in this case to be as good as that of conventional methods implementing high thrust propulsion.

One of the advantages of the method and the system of the invention is that the maneuver serving, for example, to move a satellite from a conventional geostationary transfer orbit (GTO) to geostationary orbit (GEO) while starting the thrusters only once, constitutes an important advantage since starting operations are always relatively difficult. It is thus desirable to limit starting operations given that starting is characteristic of a transient state and that always requires a great deal of attention. For example, with an electrical thruster, it takes several minutes to prepare the thruster and put it into operation, in application of a particular sequence of events. Also, when a plurality of thrusters are used to perform the maneuver, it is necessary to be able to ensure that the various thrusters all start simultaneously, particularly if their individual thrusts do not pass close to the center of mass of the space vehicle. If they do not start simultaneously, then it is necessary to act on the attitude control system of the space vehicle to cancel attitude drift. The control system can become saturated and starting must be aborted and tried again later. It is thus particularly advantageous, throughout the duration of travel between the initial orbit and the target orbit, and in particular at least while the sidereal periods of the intermediate orbits are significantly different from the sidereal period of rotation of the earth, to be able to ensure that the thrusters need starting only once. Such a single start can be performed when the satellite is well placed for visibility from a particular ground station. There is thus no need to have a plurality of ground stations available, and in addition, the location at which the single start is performed is of relatively little importance. Further, this advantage of starting only once shows that the method of the invention for putting a satellite into its target orbit is well suited to automating control, and consequently to the space vehicle being autonomous while it is being put into orbit, thereby reducing the costs of putting it into orbit.

Another important advantage of the present invention lies in the fact that a complete maneuver for putting the satellite into orbit makes use of only one type of thruster, i.e. thrusters of high specific impulse or, where appropriate, also of auxiliary thrusters but that make use of the same inert gas as said thrusters of high specific impulse. This contributes to reducing the cost of making the space vehicle and of operating it, and it limits the risks associated with using chemicals and hypergols or other toxic substances, given that the main types of high specific impulse thruster hardly ever use chemicals other than an inert gas such as xenon.

Also, since the maneuver of the invention necessarily leads to the thrusters operating continuously, the mass consumed by the thrusters during the maneuver is directly proportional to the duration of the maneuver. As a result, in the context of the present invention, it suffices to optimize the steering of the thrusters during the maneuver in order to minimize the duration of the maneuver and thus also minimize the mass that is consumed during the maneuver.

Various optimization methods can be used to determine appropriate steering relationships while satisfying the proposed criteria for variations in apogee and perigee parameters.

Thus, in particular, for steering at the beginning of the maneuver, it turns out that a thrust relationship lying in the local horizontal plane is particularly effective from a conventional geostationary transfer orbit GTO. Towards the end of the maneuver, a thrust relationship lying in the horizontal plane around the apogee of the orbit and anti-tangential to the orbital speed around perigee is satisfactory. A fixed steering or inertial relationship is also of interest during the maneuver.

At the end of the maneuver, it may be advantageous to have a satellite facing towards the earth (consequence of a steering relationship for thrust in the local horizontal plane) in particular for the purpose of performing certain adjustments that may be necessary to the payload, for example, simultaneously with finalization of the maneuver for putting the satellite into its orbit (i.e. while the thrusters are still operating).

It may be observed that the measures recommended by the present invention for steering the thrusters turn out, in the case of reaching a geostationary orbit from a conventional transfer orbit, to be particularly suited to performing short duration maneuvers without significantly increasing the mass of matter consumed during said duration as compared with conventional systems using chemical propulsion.

Thus, by way of example, for a 2950 kg satellite fitted with plasma thrusters having a total thrust of 0.64 N, high specific impulse of 16,000 Ns/kg, and a specific power of 16 kW/N, with the satellite being initially placed on a geostationary transfer orbit of the type intended for Ariane 5 launchers (apogee 36,000 km and perigee 620 km), the maneuver lasts for no more than 3.7 months for an electrical power consumption of 10 kW and for a mass consumption to transfer the orbit to geostationary orbit of 380 kg.

In the method of the invention for putting a satellite into orbit, it is possible to consider the notion of the specific impulse of the maneuver as a whole, defined as the ratio of the total impulse delivered to perform the maneuver of putting the satellite into its orbit divided by the initial mass of the vehicle (Mi in kg), as follows:

$$I_{spmaneuver} = F \times \Delta t / Mi$$

Since the thrusters are firing continuously, the total impulse delivered is equal to the product of the force (in Newtons) multiplied by the duration of the maneuver $\Delta t$ (in seconds).

In the example under consideration, $I_{spmaneuver}$ is 2070 N.s/kg. This quantity depends relatively little on the specific impulse of the thrusters (providing it is high). This notion of specific impulse of the maneuver makes it possible to evaluate rapidly the main characteristics and advantages of the method of the invention for putting a satellite into orbit.

In comparison, a conventional satellite having the same payload and using conventional chemical propulsion would need to have a launch mass of 4100 kg, i.e. one extra (metric) tonne, thus increasing launch costs, or for constant launch costs, reducing payload and thus profitability of the space vehicle.

Also, with a satellite having the same payload and using a high specific impulse type of propulsion giving 16,000 Ns/kg and thrust analogous to that mentioned in the above example (0.64 N), but achieving orbit transfer by making use, for example, of a method relying on thrust arcs around orbit apogee or even a method constituted by thrust arcs around apogee and thrust arcs around perigee, the takeoff mass would be of the same order of magnitude (e.g. 2860 kg), but the total duration of the maneuver for putting the satellite on its final orbit would be lengthened to 4.8 months, i.e. it would be about 30% longer than that required for putting a satellite into orbit by means of the present invention.

The advantage provided in this way by the present invention is very significant since it serves in particular to reduce the financial costs due to the investment that must be made to build the satellite and to launch it before it starts earning. In addition, ground-based means are used for less time during the maneuver so the total cost thereof is also reduced.

Another advantage provided by the type of maneuver performed in the invention lies in a significant reduction of the time spent passing through the Van Allen belts in comparison with a maneuver relying on thrust arcs. Because the apogee altitude of the intermediate orbits is increased, it is possible in particular to increase speed in the vicinity of perigee, specifically where the belts of protons and electrons are to be found, thereby reducing the time spent passing through the Van Allen belts compared with performing the transfer using the same thrusters but by means of apogee thrust arcs. In addition, perigee altitude increases much more quickly, so the total number of passes through the Van Allen belts is also considerably reduced.

Another advantage associated with the present invention consists in its efficiency increasing with increasing inclination of the initial orbit relative to the target final orbit. The increase in apogee altitude makes it possible to correct a difference of inclination more effectively, which is a characteristic advantage specific to supergeosynchronous orbits, for example, and the greater the altitude, the greater the effectiveness. In this case, it is merely necessary also to verify that the apogees of the intermediate orbits are indeed situated in the plane of the target final orbit and that the total thrust is steered about the apogee so as to reduce difference in inclination, with thrust lying partially outside the orbital plane. Maximum effectiveness of the maneuver is obtained when the steering of total thrust does not change any orbital parameter other than apogee altitude, perigee altitude, and inclination. It follows that when the satellite is placed on its initial orbit, if the apogee of the initial orbit lies in the plane of the target final orbit, then that configuration will continue, and correcting inclination difference is performed more effectively. It is possible to take account of the so-called "disturbing" influences of the moon, the sun, and the non-spherical gravitational potential of the earth to improve the effectiveness of the correction.

Another advantage associated with the present invention lies in the possibility of deploying the satellite completely or in part before its thrusters are put into operation. This is made possible because the high specific impulse thrusters deliver such low thrust that the drive thereof does not generate stresses that could damage fragile structures such as solar panels or solar concentrators, or deployable antennas and masts.

In some cases, the antennas may be deployed only after the thrusters have stopped firing, if the thrusters are positioned so that they might pollute or erode the active surfaces of the antennas. Conversely, by deploying the solar panels, even before the thrusters begin to fire, it is possible for the high specific impulse thrusters to make effective use of the electrical power produced by the solar panels.

BRIEF DESCRIPTION OF THE DRAWINGS

Other characteristics and advantages of the invention appear from the following description of particular implementations of the invention, given as examples and made with reference to the accompanying drawings, in which:

FIG. 4 is a perspective diagram showing a spiral type method of the invention for reaching orbit with continuous thruster operation and starting from an elliptical initial orbit;

FIGS. 5 and 6 are views of the FIG. 4 diagram respectively on a plane XOY and on a plane orthogonal to the XOY plane and containing an axis Z;

MORE DETAILED DESCRIPTION

Figure 1:
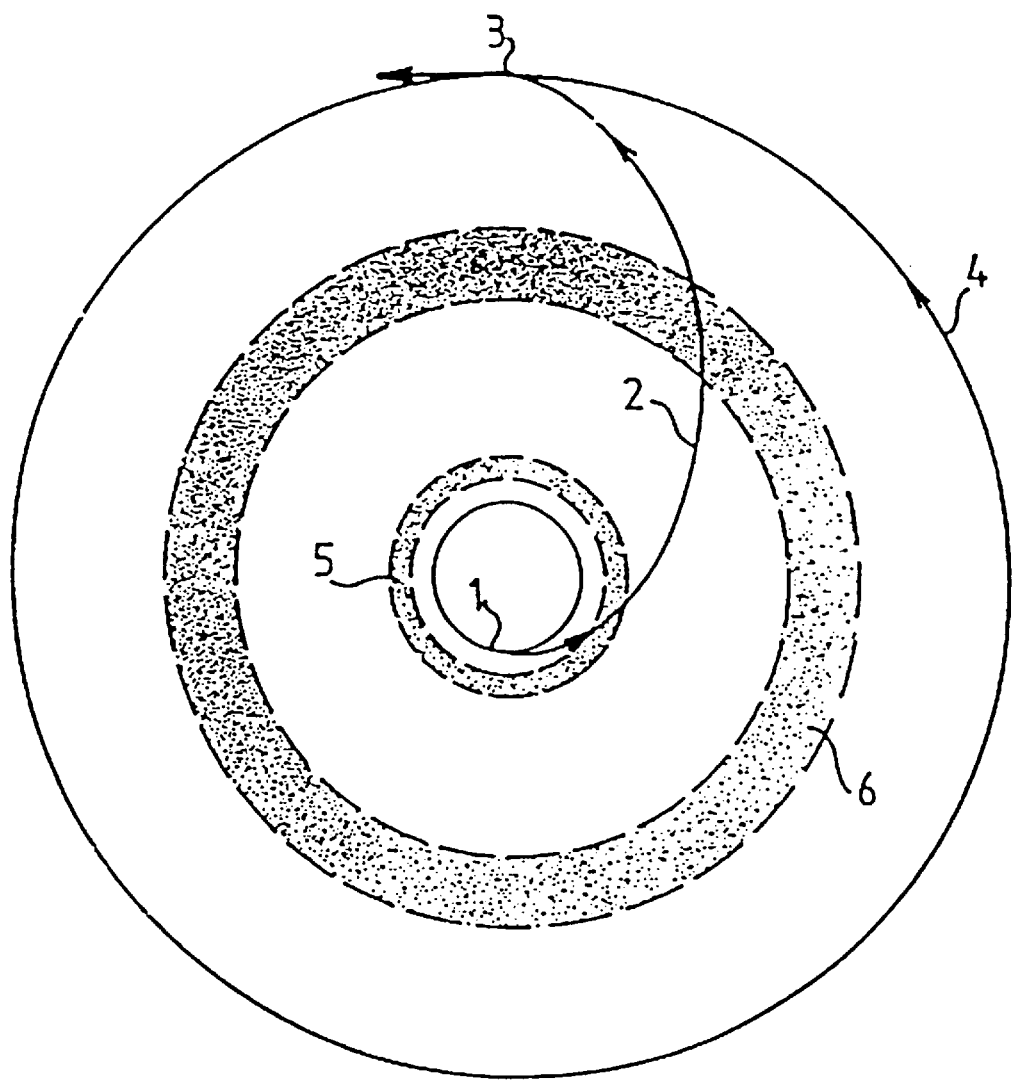
FIG. 1 is a diagram showing a conventional way of reaching geostationary orbit using an impulse at a single point.
Figure 2:
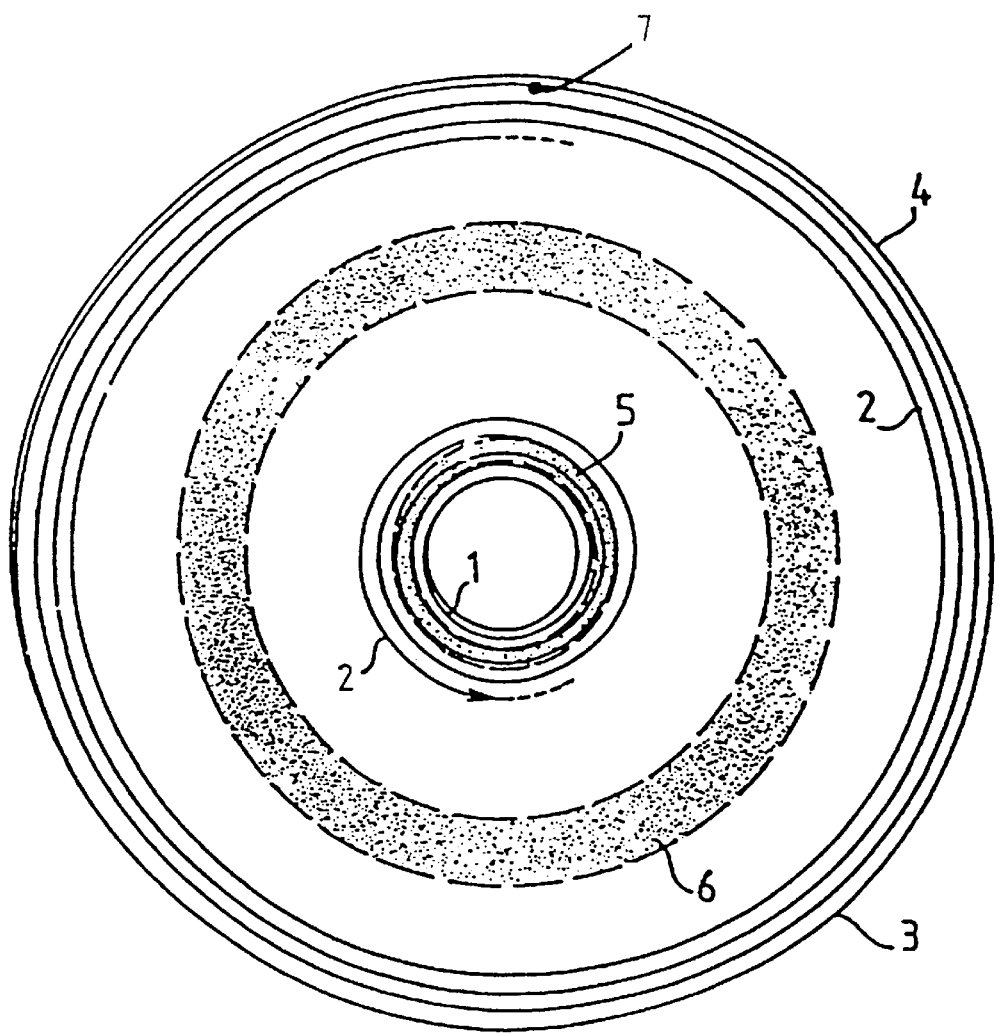
FIG. 2 is a diagram showing a spiral method of reaching orbit with the thrusters operating continuously and starting from an initial orbit that is circular.
Figure 3:
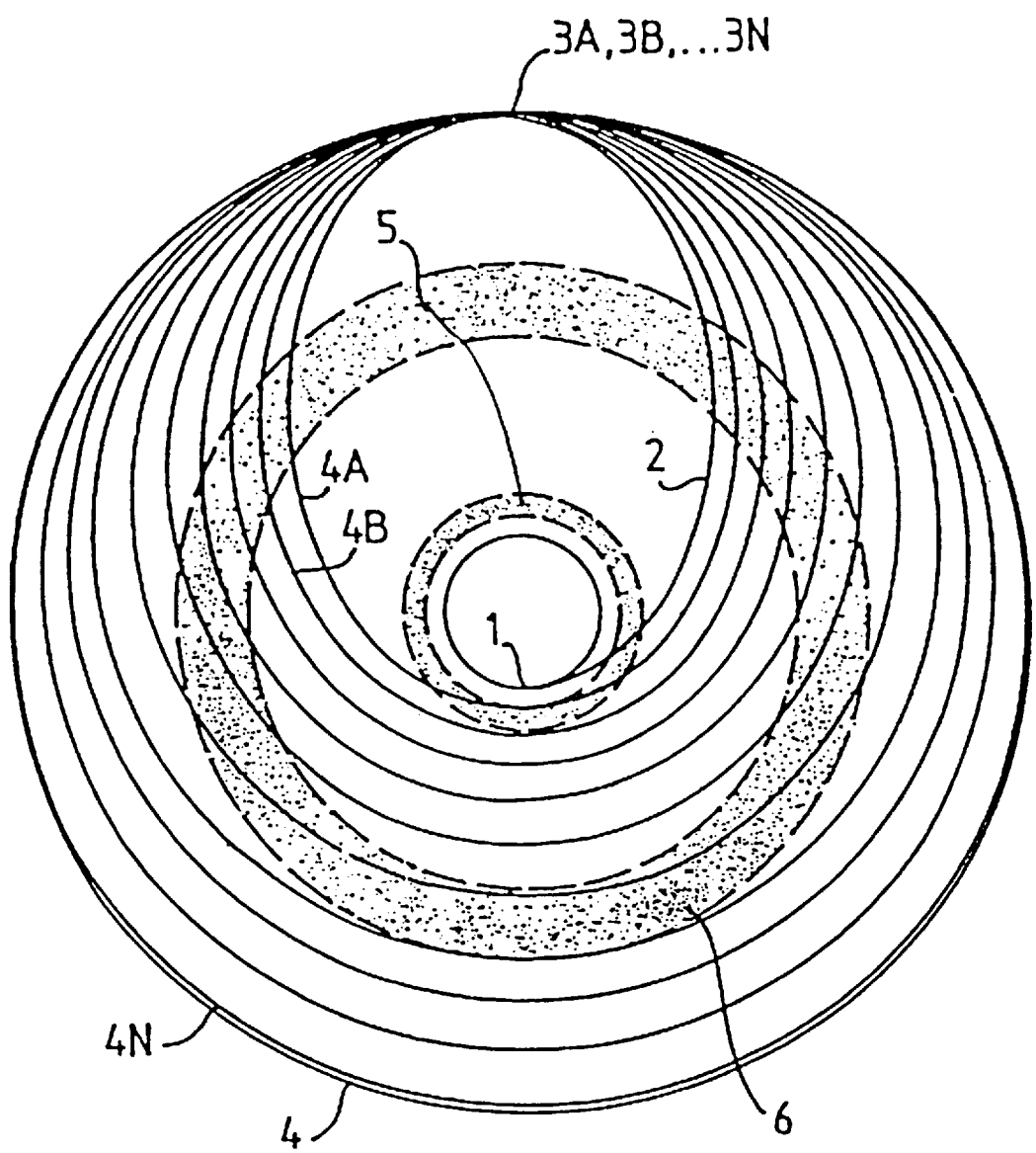
FIG. 3 is a diagram showing how orbit can be reached by using thrust arcs, operating the thrusters discontinuously and starting from an elliptical initial orbit.

Three conventional methods that have already been proposed for placing a satellite on a circular orbit, and they are recalled initially with reference to FIGS. 1 to 3.

FIG. 1 is a diagram of the various stages in the Hohmann maneuver, comprising a launch stage 1 during which the rocket places a satellite on a low orbit, followed by a transfer stage 2 during which the satellite is injected by an increase of speed at perigee onto an elliptical orbit whose apogee corresponds to the desired final altitude, and at which a second increase of speed 3 serves to inject the satellite onto a final circular orbit 4. Portions referenced 5 and 6 represent zones of intense radiation known as the Van Allen belts.

FIG. 2 shows the use of a spiral trajectory implementing acceleration that is very low, but continuous. There can be seen the stage 1 of launching into low circular orbit, and the transfer stage 2 which is constituted by the spiral orbit proper. Reference 7 shows the location where spiral firing is stopped. Reference 3 shows the location of the final maneuver that serves to inject the satellite into the final circular orbit 4. The Van Allen belts are marked by references 5 and 6 as in FIG. 1.

The drawbacks of the orbit changing methods shown in FIGS. 1 and 2 are described above and are not described again.

FIG. 3 shows how an orbit is reached by applying a "thrust arc" method.

After the launch stage 1, the satellite is put on a first elliptical half-orbit 2 and towards the apogee thereof thrusters are fired to deliver a speed increment 3A. The satellite then describes a second elliptical orbit 4A having a perigee that is considerably higher and an apogee that is very slightly higher. Firing the thruster again adds another speed increment 3B at the new apogee, thereby placing the vehicle on a new elliptical orbit 4B having a perigee that is considerably higher and an apogee that is slightly higher than in the preceding orbit. This is continued until reaching elliptical orbit 4N whose apogee corresponds to the desired final altitude, enabling the vehicle to be placed on its final circular orbit 4.

As in FIGS. 1 and 2, the Van Allen belts are marked by references 5 and 6.

The drawbacks of a method of reaching orbit by the technique of successive thrust arcs are already given above and are not described again.

With reference to FIGS. 4 to 6, there follows a description of a method of the present invention for putting a space vehicle such as a satellite into orbit.

After a stage 101 of launching from the earth 100, by means of a launcher, a satellite is placed on an elliptical orbit 102.

Firing to put the satellite on its final orbit can be performed either immediately, or else at the convenience of the user, after a certain number of revolutions on the initial orbit 102, e.g. when the satellite reaches a point 103.

At the moment when it is decided to start transferring the satellite situated at point 103, a set of high specific impulse thrusters belonging to the satellite is caused to fire, with the number of said thrusters possibly being limited to one.

The high specific impulse thrusters are caused to operate continuously, and by steering their total thrust, they cause the satellite to describe a spiral 104A, 104B, . . . , characterized by successive intermediate orbits in which apogee altitude increases more quickly than perigee altitude.

Once the apogee altitude of an intermediate orbit is sufficient, e.g. at point 104G, the thrusters are kept in operation, and it is only the relationship controlling steering of total thrust that is modified in order also to change inclination.

When the satellite describes portion 104K of the spiral trajectory, the thrusters are kept in operation and only the total thrust steering relationship is modified so that the spiral described then decreases in apogee altitude on each revolution, i.e. on each new intermediate orbit, while perigee altitude increases.

Once the desired change in inclination has been obtained, e.g. at point 104N, the thrusters are kept in operation and only the total thrust steering relationship is modified to bring the thrust into alignment with the orbital plane while keeping it oriented in such a manner that apogee altitude decreases while perigee altitude increases.

The spiral then continues by means of intermediate orbits 104N to 104P. The thrusters are caused to cease operating at point 107, for example, once the apogee and perigee altitudes are equal or approximately equal to the altitudes required by the target final orbit.

As can be seen from the example described above, it may be advantageous for the inclination of the orbit not to be changed immediately on starting the thruster(s). At the beginning of firing with continuous operation of the thrusters, it is appropriate to allow perigee altitude to increase quickly so as to minimize the time spent passing through the Van Allen belts. This time could be lengthened if inclination is to be changed as well, since that would require a reduction in the thrust component serving to increase perigee altitude.

Similarly, the desired change of inclination could be completed at point 104N even before the target final orbit has been reached, so as to optimize overall performance, given that the greater the apogee altitude, the greater the effectiveness with which inclination is changed.

The various stages of thruster operation during the spiral trajectory can take into account the constraint of final positioning of the vehicle at its target point on the geostationary orbit, or in the vicinity thereof. Great latitude exists during the spiral trajectory which, at the cost of a minor impact on performance, make it possible to reach any point on the geostationary orbit when the thrusters cease to operate.

It may be observed that the method of the invention has the particular advantage of making it possible to define a maneuver during which the thrusters need to be started only once, and which suffices to go from an initial orbit to a target final orbit. Naturally it is always possible to interrupt firing of the thruster(s) temporarily, at the convenience of the user, for reasons other than the needs of reaching the final orbit, e.g. for performing maintenance operations on the trusters or the satellite, or to satisfy orbit-mapping, telemetry, or remote control requirements.

Also, in certain applications, inclination can be changed as soon as the thrusters begin to fire or right up to the end of thruster firing if, for example, it is desired to bring the satellite more quickly to its final position on the geostationary orbit or to avoid passing through the geostationary orbit with zero inclination.

As is known, apogee and perigee are defined as being maximum and minimum distances relative to the earth as reached by a space vehicle during one revolution. In general, the orbit described by the satellite is close to elliptical in shape, even while the high specific impulse thrusters are in operation, given that their thrust is low. That is why it can be considered that the apogee and perigee in question can be approximately those of the ellipse osculating the mean orbital trajectory.

Figure 9:
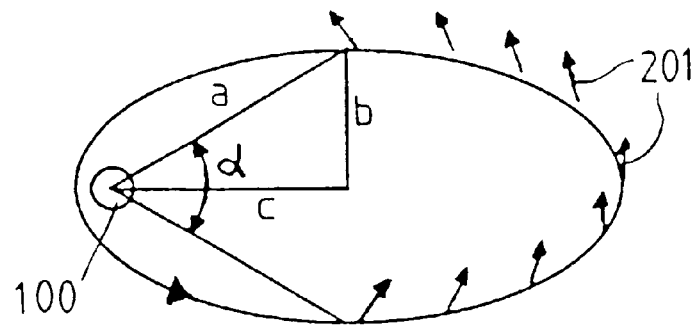
FIG. 9 is a diagram showing an elliptical orbit and defining the zone of thrust around the half-ellipse centered on apogee.
Figure 10:
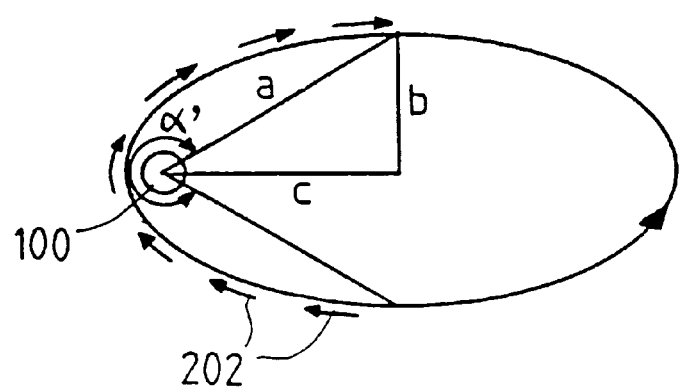
FIG. 10 is a diagram showing an elliptical orbit and defining the zone of thrust around the half-ellipse centered on perigee.

To obtain the looked-for effect during the stages of operation corresponding to trajectory portions 104K to 104N, it is possible during the half-ellipse centered on apogee to steer thrust in the local horizontal plane, as shown diagrammatically in FIG. 9, and to steer thrust during the half-ellipse centered on perigee in a plane orthogonal to the orbital plane and tangential to the orbit, in the opposite direction to the speed, as shown diagrammatically in FIG. 10.

In FIGS. 9 and 10, there can be seen respectively the angle α of the apogee thrust arc and the angle α' of the perigee thrust arc. In FIGS. 9 and 10, the following parameters of the ellipse are marked:

a=semi major axis b=semi minor axis c=distance between the focus and the center of the ellipse. The eccentricity of the ellipse is then given by the ratio c/a.

Figure 11:
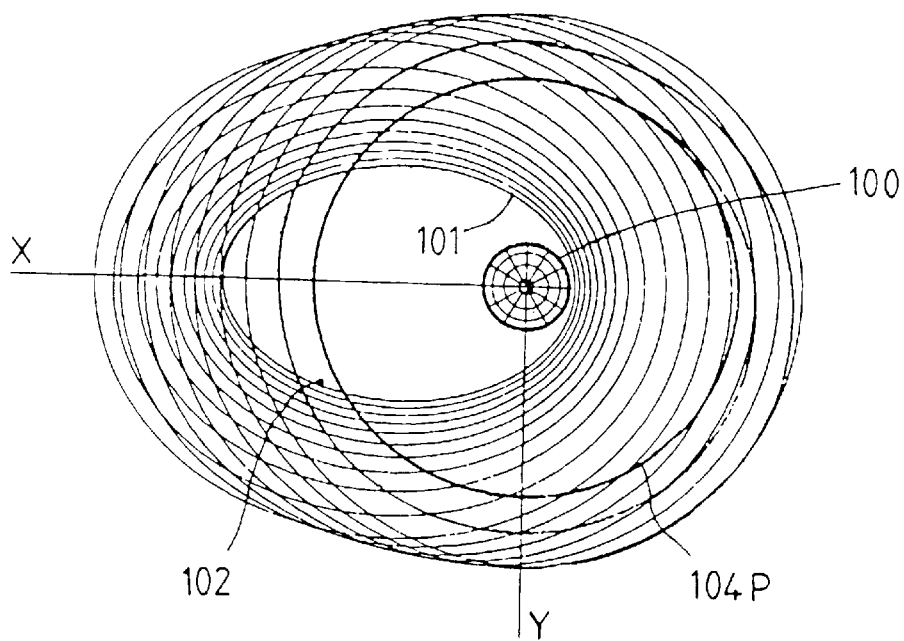
FIG. 11 is a diagram analogous to FIG. 5 showing a particular example of the method of the invention as applied to reaching a geostationary orbit by a "similar" method.

FIG. 11 shows how orbit can be reached using a "similar" method. This method provides a very significant advantage concerning time spent passing through the Van Allen belts. The initial orbit is an orbit having a perigee of 620 kg and an apogee of 71,000 km. Continuous firing of the high specific impulse thrusters begins in the vicinity of the beginning of the half-ellipse that is said to be "around" apogee.

The total thrust is directed in the local horizontal plane giving rise to increases both of perigee altitude and of apogee altitude. Then, once perigee altitude exceeds 20,000 km (which value is a function, in particular, of Van Allen belt activity, and the value taken into consideration could be as little as 8,000 km, for example) the direction of thrust is changed so as to be inertial (i.e. tangential to speed at apogee), thus having the effect of increasing perigee altitude and of decreasing apogee altitude; and then once the eccentricity of the orbit is zero, thrust direction is changed to be tangential and opposite to speed, thus having the effect of reducing perigee altitude and of reducing apogee altitude. As a result, apogee altitude and perigee altitude are caused in the end to coincide with the altitude of the target orbit, i.e. the geostationary orbit. It may be observed that the number of orbits passing through the Van Allen belts is smaller than in the case shown in FIG. 4.

Figure 12:
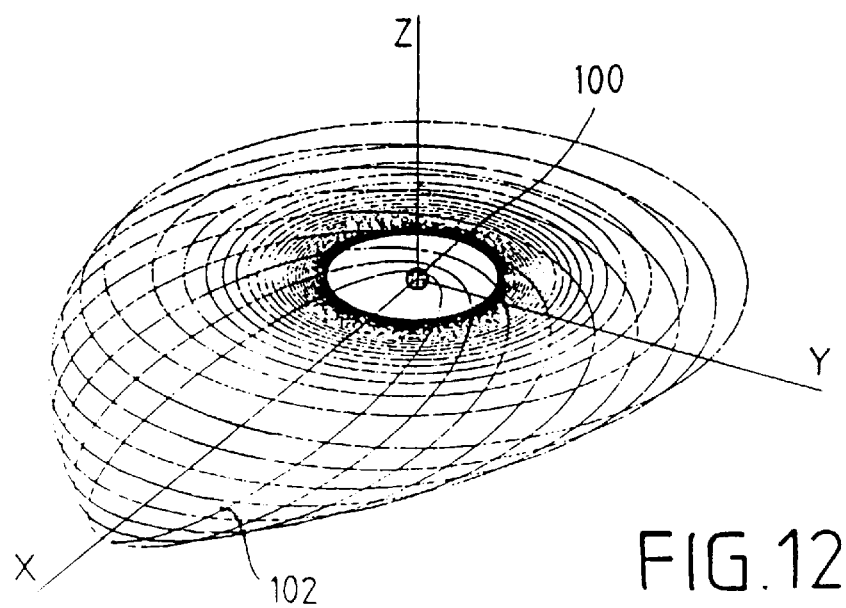
FIG. 12 is a diagram analogous to the diagram of FIG. 4 showing a particular example of the method of the invention as applied to reaching geostationary orbit by an "alternative" method.

FIG. 12 shows how orbit can be reached using the "alternative" method. This method provides a very significant advantage concerning time spent passing through the Van Allen belts. The initial orbit has a perigee of 620 km and an apogee of 330,000 km. Continuous firing of the high specific impulse thrusters begins in the vicinity of the beginning of the half-ellipse that is said to be "around" apogee. Total thrust is directed to be inertial (tangential to speed at apogee), thus having the effect of increasing perigee altitude and of decreasing apogee altitude.

Then, once the eccentricity of the orbit is zero, the thrust direction is changed so as to be in the local horizontal plane in the direction opposite to the speed, thereby reducing perigee altitude and reducing apogee altitude. As a result, perigee altitude and apogee altitude finally coincide with the altitude of the target orbit, i.e. the geostationary orbit. It may be observed that the number of orbits passing through the Van Allen belt is much smaller than in the case of FIG. 4, and is smaller than in the case of FIG. 11.

Figure 7:
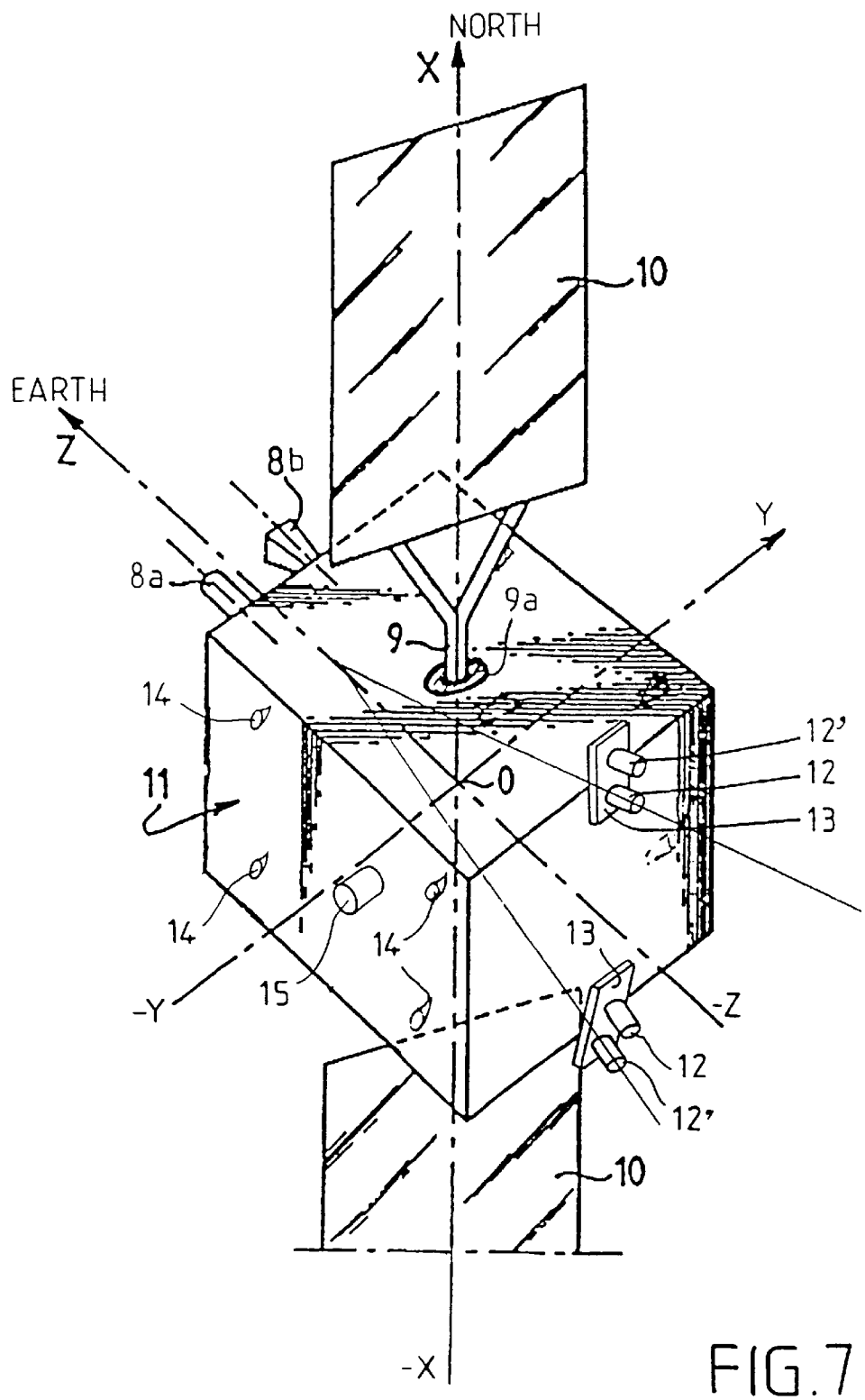
FIG. 7 is a diagrammatic perspective view of a first embodiment of a satellite to which the invention is applicable.
Figure 8:
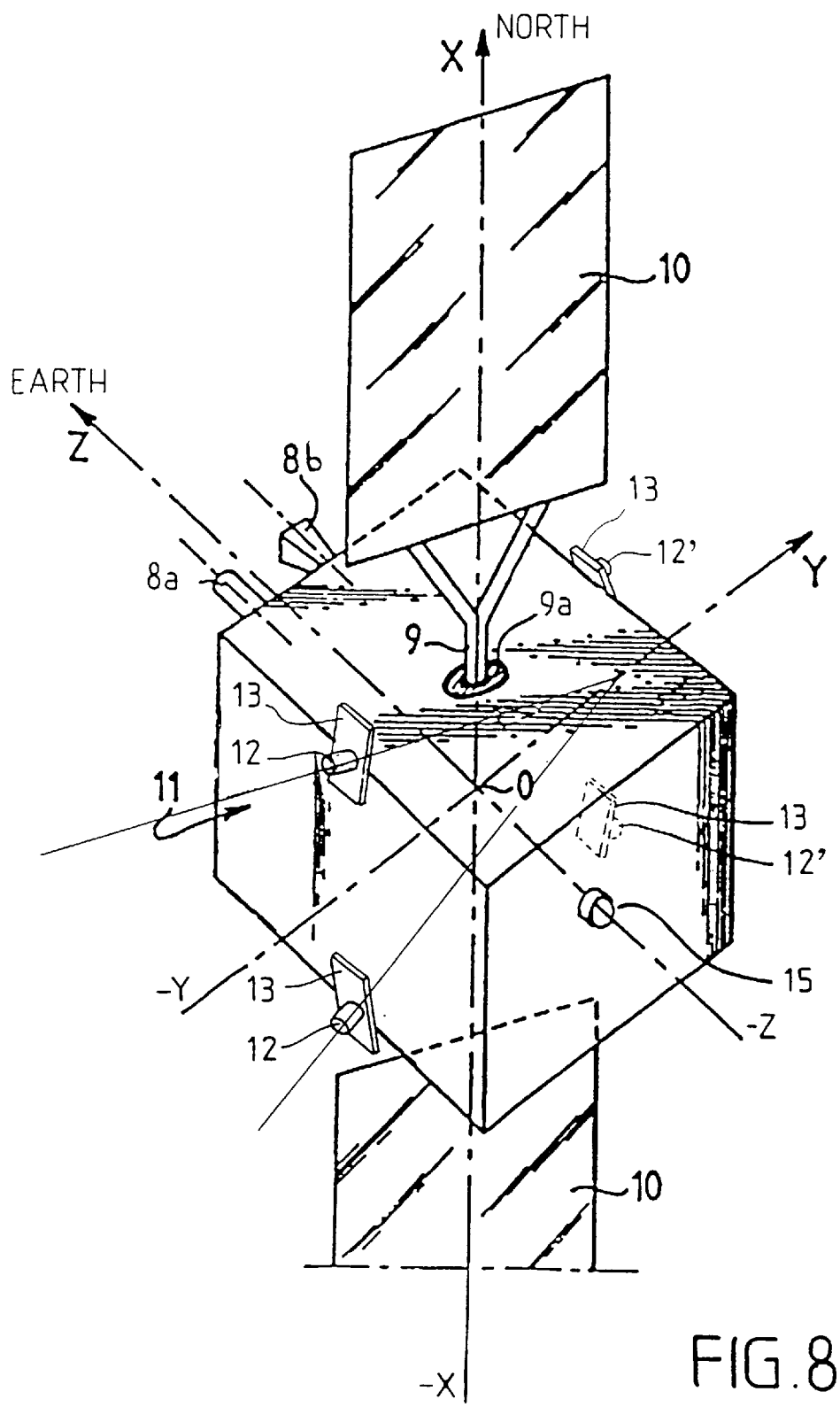
FIG. 8 is a diagrammatic perspective view of a second embodiment of a satellite to which the invention is applicable.

Reference is now made to FIGS. 7 and 8 which show two variants of a satellite 11 to which the invention is applicable. This space vehicle 11 is fitted with high specific impulse thrusters 12 mounted on platforms or bases 13, at least some of which are steerable. The thrusters 12' are designed to provide redundancy during the maneuver to reach orbit. Other auxiliary thrusters 14 using the same matter as the thrusters 12 and 12' may also be mounted on the body of the satellite 11. The satellite is fitted with solar panels 10 each mounted on a structure 9 forming part of a solar panel drive mechanism referenced 9a. The satellite is shown as having its axis OZ directed towards earth. The axis OZ is pointed towards the center of the earth by infrared horizon centers 8a or towards a beacon by a radiofrequency detection 8b. Auxiliary horizon sensors 15 may be implanted on other faces of the body of the satellite 11.

The thrusters 12 and 12' are also used for controlling orbit and attitude of the satellite during the operating lifetime of the vehicle as well as during the orbit-changing maneuver.

The system associated with the satellite for reaching its orbit comprises a device for putting the thruster(s) into operation on a continuous basis after the satellite has been placed on an initial orbit and until it has reached its target final orbit. The system also includes a device for steering thrust by acting either on the steerable bases or else on other steering means available to the satellite (e.g. inertia wheels or kinetic wheels). Means are also provided for generating steering control such that starting from an elliptical initial orbit having a sidereal period that is different from and, for example, less than that of the target final orbit:

at the beginning of the maneuver, on each successive revolution, the effect of the thrusters 12 operating and the direction in which they operate cause the apogee of the orbit to increase together with a lesser increase in the perigee of the orbit; and at the end of the maneuver, on each successive revolution, the effect of the thrusters 12 operating is to decrease the apogee of the orbit and to increase the perigee of the orbit.

The means provided for controlling steering can also be adapted to implement the above-described "alternative" method, for example.

Figure 13:
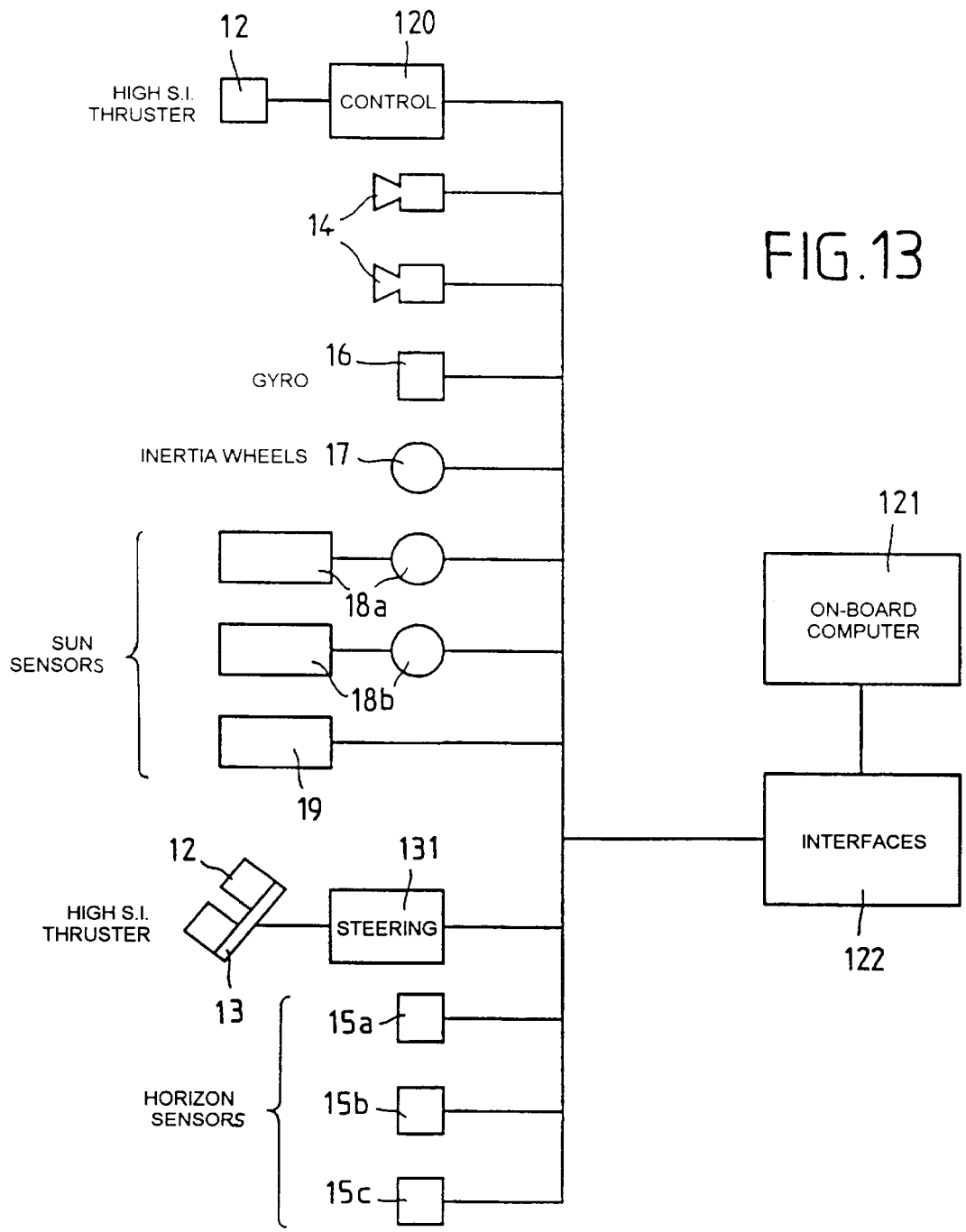
FIG. 13 is a block diagram of controlling and monitoring circuits in a system of the invention.

As shown diagrammatically in FIG. 13, various methods can be used to steer the total thrust by the means that generate the steering control signals.

To steer thrust in a local horizontal plane, the steering frame of reference may be given by an infrared horizontal sensor 15a capable of accommodating varying distance between the earth and the satellite (e.g. a scanning sensor or a CCD matrix sensor). Third axis (yaw axis) control may be obtained in the general case by using a sun or star sensor 18a, 18b, or 19. Aiming accuracy to within ±2° is more than sufficient for performing the mission.

Thereafter, to steer thrust in a manner that is antitangential to orbital speed, the satellite rotates through about 180° about the north-south axis so as to reverse the thrust direction. It is then necessary to have auxiliary horizon sensors 15b and 15c on two opposite faces (east-west). The rotation is advantageously achieved by creating torque by means of the kinetic wheel or the reaction wheel 17 disposed on the north-south axis, and the amplitude of the rotation is measured by an integrating gyro 16, or by solar sensors 18a and 18b.

To steer the thrust in an inertial direction, a sun sensor 18a, 18b, or 18c provide an attitude reference that moves substantially through 1° per day relative to the stars. The onboard computer 121 computes the angle between the sun and the direction desired for total thrust and controls rotation of the satellite accordingly (by acting on the inertia wheel 17 via the attitude and orbit control system 122) until the desired angle is reached.

If the sun sensor is situated on the solar panel 10 (sensors 18a and 18b), the computer 121 causes the angle between the solar panels 10 and the satellite body 11 to vary by acting on the solar panel drive mechanisms while the attitude and orbit control system 122 of the satellite (AOCS) is solar controlled to point the panel towards the sun.

An attitude controlling torque can also be created by deliberately pointing the steerable bases 13 supporting the high specific impulse thrusters 12 and 12'.

FIG. 13 shows a set of high specific impulse thrusters 12 started under the control of a control circuit 120, a set of optional small auxiliary thrusters 14 using the same matter (e.g. xenon) as the set of thrusters 12, a gyro 16, reaction wheels 17, a sun sensor 18a for controlling the north solar panel drive mechanism, a sun sensor 18b for controlling a south solar panel drive mechanism, a set of sun sensors 19 secured to the body of the satellite 11, plates 13 for supporting the high specific impulse thrusters 12, a circuit 131 for controlling steering of the plates 13, an infrared horizon sensor 15a, an onboard computer 121, and interfaces and actuators 122 constituting a system for controlling attitude and orbit.

Optionally, and as also shown in FIG. 13, there may be an east horizontal sensor 15b and a west horizontal sensor 15c.

To steer the total thrust away from the orbital plane (as is required when it is desired to change the inclination of successive orbits), it is possible to pivot the entire satellite about its yaw axis for example (axis OZ in FIG. 8).

Figure 14:
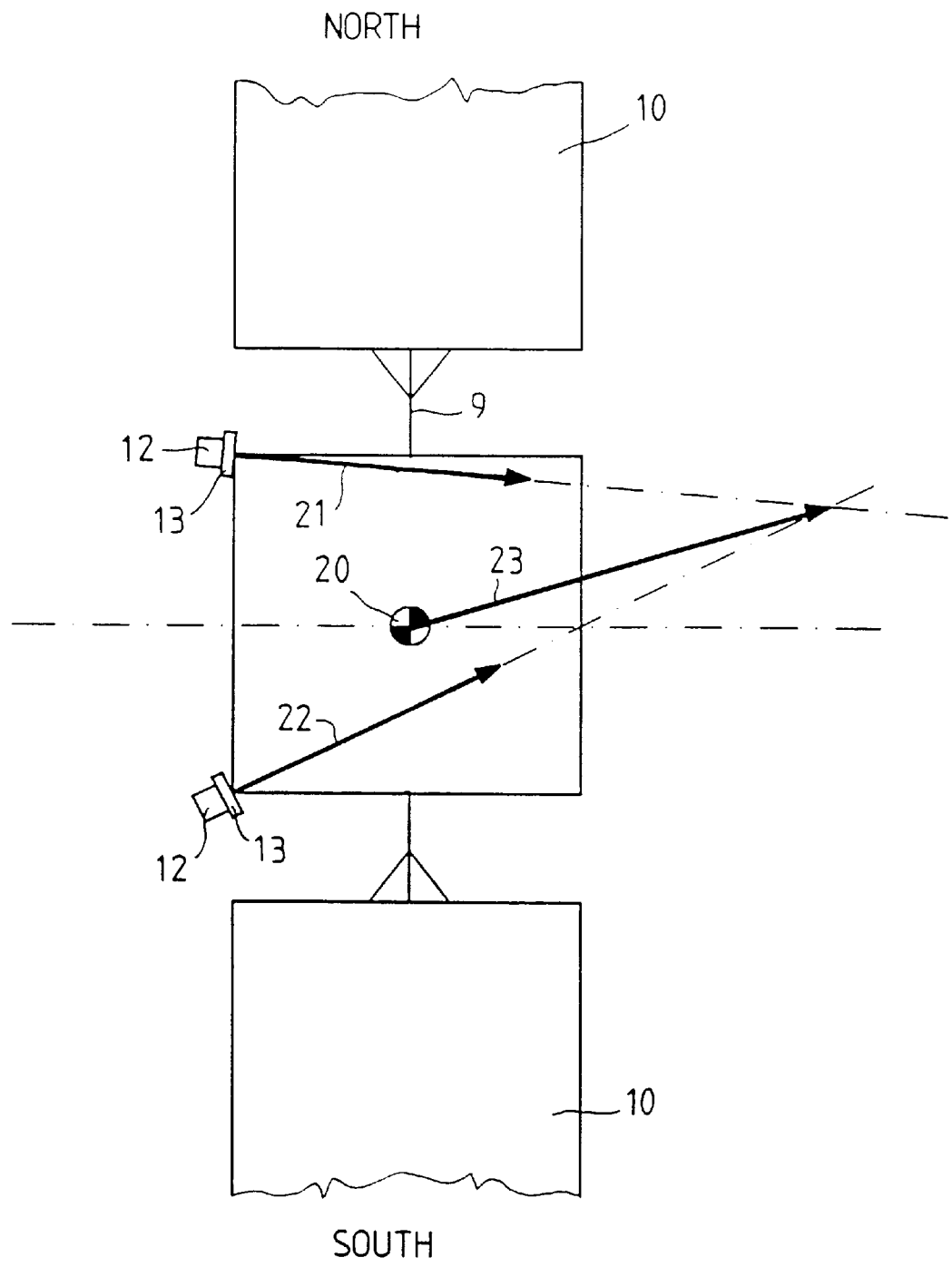
FIG. 14 is a diagram applicable to a system of the invention showing how total thrust can be steered out from the orbital plane by modulating the thrust of one of the thrusters.

If, as shown in FIGS. 7 and 8, a plurality of high specific thrusters are installed, e.g. two thrusters, it is also possible to steer total thrust with a component lying outside the orbital plane by appropriately steering the steerable bases 13 and also modulating the intensity of thrust from one of the two thrusters 12 so that in spite of the component lying outside the orbital plane, the total thrust vector passes through the center of mass of the vehicle. This particular possibility is shown diagrammatically in FIG. 14. To obtain total thrust (vector 23) passing through the center of mass 20 and having a component lying outside the orbital plane, the steerable bases 13 are steered differently for the thrusters 12 on the north and on the south. Thrust from the north thruster 12 (vector 21) is adjusted so that the total thrust of vector 23 which is equal to the vector sum of the vectors 21 and 22 passes through the center of mass 20.

Figure 15:
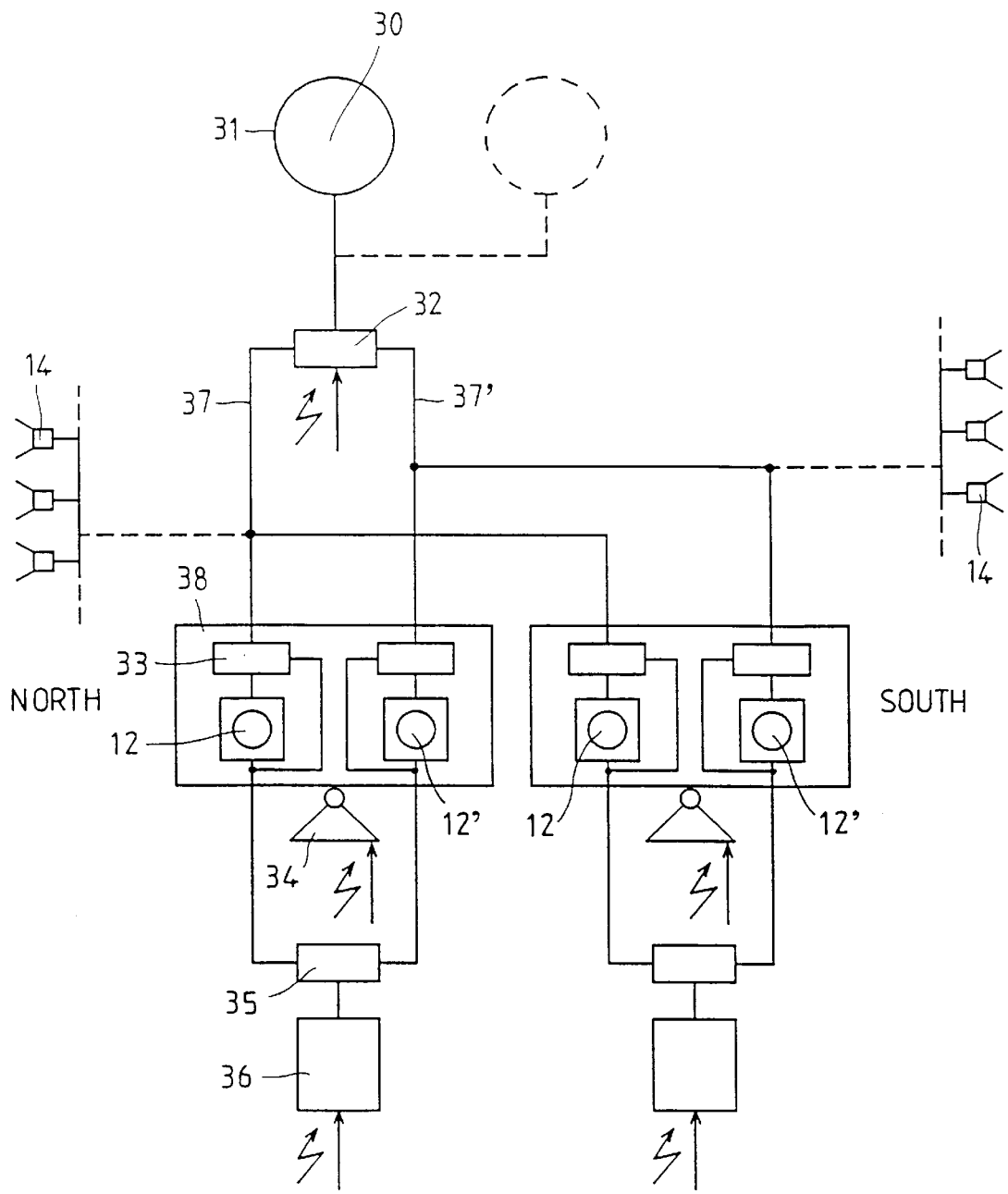
FIG. 15 is a block diagram of a system of the invention using a propulsive system having high specific impulse thrusters of the closed electron drift plasma type.

FIG. 15 is a block diagram of a propulsion system enabling orbit to be reached in application of the invention.

One or more tanks 31 of matter 30, e.g. xenon, feed(s) a manifold 32. The manifold 32 may contain a system for regulating pressure or flow rate together with a set of valves and sensors (not shown). Via nominal lines 27 and redundant lines 37', the manifold 32 delivers the matter 30 to flow rate controllers 33 which feed the high specific impulse thrusters 12 and 12'. Optional auxiliary thrusters 14 using the same matter 30 are fed from the lines 37 and 37'.

The thrusters 12 and 12' are fed with electrical power via an electricity distributor 35 that may contain a set of relays and that comes from an electricity conditioning module 36, itself directly connected to the electrical power source of the space vehicle and to its control and monitoring bus.

Each base 38 supporting two thrusters 12 and 12' is steerable relative to the space vehicle by command action on a respective steering device 34.

The system of the invention is mainly applicable to transfers between initial orbits that are elliptical such as GTO, and target final orbits that are circular such as GEO. However, it may also be advantageous, starting from an elliptical initial orbit GTO to reach some other elliptical orbit that is inclined differently.

What is claimed is:

1. A method of placing a space vehicle, such as a satellite, on a target orbit such as that adapted to normal operation of the space vehicle and starting from an elliptical initial orbit that is substantially different from the target orbit and in particular more eccentric than the target orbit, wherein the space vehicle is subjected to a maneuver comprising a single continuous firing of a set of high specific impulse thrusters mounted on the space vehicle, during a first stage of the maneuver, the space vehicle is caused to describe a spiral trajectory made up of a plurality of intermediate orbits, progress of the spiral trajectory being controlled in such a manner that on each successive revolution, at least during the first stage of the maneuver, apogee altitude increases, perigee altitude increases to a lesser extent, and any difference in inclination between an intermediate orbit and the target orbit decreases, then, at least during a second stage of the maneuver, changes in perigee and apogee altitude are controlled individually in constant predetermined directions while any difference in inclination of an intermediate orbit relative to the target orbit continues to be reduced until the apogee altitude, the perigee altitude, and the orbital inclinations of an intermediate orbit of the space vehicle have reached substantially the values of the target orbit, and wherein during the second stage of the maneuver, until the end of continuous firing, on each successive revolution, apogee altitude of intermediate orbits is decreased while perigee altitude is increased.

2. A method of placing a space vehicle, such as a satellite, on a target orbit such as that adapted to normal operation of the space vehicle and starting from an elliptical initial orbit that is substantially different from the target orbit and in particular more eccentric than the target orbit, wherein the space vehicle is subjected to a maneuver comprising a single continuous firing of a set of high specific impulse thrusters mounted on the space vehicle, during a first stage of the maneuver, the space vehicle is caused to describe a spiral trajectory made up of a plurality of intermediate orbits, progress of the spiral trajectory being controlled in such a manner that on each successive revolution, at least during the first stage of the maneuver, apogee altitude increases, perigee altitude increases, and any difference in inclination between an intermediate orbit and the target orbit decreases, then, during a second stage of the maneuver, near the middle of continuous firing, and on each successive revolution, changes in perigee and apogee altitude are controlled individually in constant predetermined directions while any difference in inclination of an intermediate orbit relative to the target orbit continues to be reduced, apogee altitude of intermediate orbits being decreased and perigee altitude being increased, and then during a third stage of the maneuver, once the eccentricity of intermediate orbits of the space vehicle has substantially reached that of the target orbit, and until the end of continuous firing, during each successive revolution, apogee altitude is decreased and perigee altitude is decreased while any difference of inclination of intermediate orbits relative to the target orbit continues to be reduced, until apogee altitude, perigee altitude, and orbital inclination of an intermediate orbit of the space vehicle have reached substantially the values of the target orbit.

3. A method of placing a space vehicle, such as a satellite, on a target orbit such as that adapted to normal operation of the space vehicle and starting from an elliptical initial orbit that is substantially different from the target orbit and in particular more eccentric than the target orbit, wherein the space vehicle is subjected to a maneuver comprising a single continuous firing of a set of high specific impulse thrusters mounted on the space vehicle, during a first stage of the maneuver, the space vehicle is caused to describe a spiral trajectory made up on a plurality of intermediate orbits, progress of the spiral trajectory being controlled in such a manner that on each successive revolution, at least during the first stage of the maneuver, apogee altitude decreases, perigee altitude increases, and any difference in inclination between an intermediate orbit and the target orbit decreases, then, at least during a second stage of the maneuver and until the end of continuous firing, changes in apogee and perigee altitude are controlled individually in constant predetermined directions while any difference in inclination of an intermediate orbit relative to the target orbit continues to be reduced until the apogee altitude, the perigee altitude, and the orbital inclinations of an intermediate orbit of the space vehicle have reached substantially the values of the target orbit such that apogee altitude is decreased and perigee altitude is also decreased.

* * * * *

UNITED STATES PATENT AND TRADEMARK OFFICE
CERTIFICATE OF CORRECTION

PATENT NO. : 6,116,543
DATED : September 12, 2000
INVENTOR(S) : Christophe Koppel Page 1 of 1

It is certified that error appears in the above-identified patent and that said Letters Patent is hereby corrected as shown below:

Title page,
Between [22] and [51], should read -- [30] Foreign Application Priority Data April 5, 1996 [FR] France . . . 9604330 --.

Signed and Sealed this

Ninth Day of October, 2001

Attest:

*Nicholas P. Godici*

NICHOLAS P. GODICI
*Acting Director of the United States Patent and Trademark Office*

*Attesting Officer*